(12) United States Patent
Shimohira et al.

(10) Patent No.: US 8,017,257 B2
(45) Date of Patent: Sep. 13, 2011

(54) POLYMER, POLYMER ELECTROLYTE MEMBRANE FOR POLYMER ELECTROLYTE FUEL CELL, AND MEMBRANE/ELECTRODE ASSEMBLY

(75) Inventors: Tetsuji Shimohira, Chiyoda-ku (JP); Kazuo Hamazaki, Chiyoda-ku (JP); Susumu Saito, Chiyoda-ku (JP); Satoru Hommura, Chiyoda-ku (JP); Seigo Kotera, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 724 days.

(21) Appl. No.: 12/019,355

(22) Filed: Jan. 24, 2008

(65) Prior Publication Data

US 2009/0004527 A1    Jan. 1, 2009

(30) Foreign Application Priority Data

Jan. 26, 2007 (JP) ................................. 2007-016039

(51) Int. Cl.
*H01M 8/10* (2006.01)
(52) U.S. Cl. ............ 429/33; 429/46; 526/243; 528/391
(58) Field of Classification Search .................... 429/33, 429/46; 526/243; 528/391
See application file for complete search history.

(56) References Cited

U.S. PATENT DOCUMENTS

| 5,463,005 A | 10/1995 | Desmarteau | |
| 6,977,122 B2* | 12/2005 | Colombo et al. | 429/494 |
| 2002/0160272 A1* | 10/2002 | Tanaka et al. | 429/314 |
| 2003/0035991 A1* | 2/2003 | Colombo et al. | 429/33 |
| 2006/0106252 A1* | 5/2006 | Murata et al. | 562/825 |
| 2008/0146841 A1* | 6/2008 | Kaneko et al. | 562/825 |
| 2008/0193821 A1* | 8/2008 | Shimohira et al. | 429/33 |

FOREIGN PATENT DOCUMENTS

| EP | 2 109 171 A1 | 10/2009 |
| JP | 2004-2841 | 1/2004 |
| JP | 2005-135681 | 5/2005 |
| JP | 2005-216769 | 8/2005 |
| WO | WO 03/106515 A1 | 12/2003 |

(Continued)

OTHER PUBLICATIONS

U.S. Appl. No. 11/771,332, filed Jun. 29, 2007, Shimohira, et al.

(Continued)

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

A polymer electrolyte membrane made of a polymer having a low electrical resistance, high heat resistance and is strong against repeats of swelling and shrinkage. Thus, a membrane/electrode assembly for polymer electrolyte fuel cells having high power generation performance and excellent in durability can be provided. The polymer has repeating units represented by the following formula (U1) and repeating units represented by the following formula (U2):

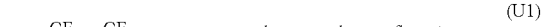

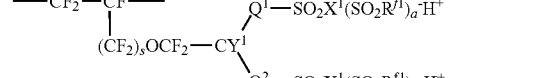

7 Claims, 2 Drawing Sheets

FOREIGN PATENT DOCUMENTS

WO    WO-2005/003062 A2 *   1/2005
WO    WO 2007/013533 A1    2/2007

OTHER PUBLICATIONS

U.S. Appl. No. 11/771,414, filed Jun. 29, 2007, Shimohira, et al.
U.S. Appl. No. 12/010,586, filed Jan. 28, 2008, Kaneko, et al.
U.S. Appl. No. 12/010,589, filed Jan. 28, 2008, Kaneko, et al.
U.S. Appl. No. 12/483,315, filed Jun. 12, 2009, Kotera, et al.
U.S. Appl. No. 12/533,667, filed Jul. 31, 2009, Hommura, et al.
M. Doyle, et al., "Perfluorinated Membranes," Handbook of Fuel Cells, Fundamentals, Technology and Applications, vol. 3: Fuel Cell Technology and Applications Part 1, John Wiley & Sons, Ltd., 2003, Chapter 30, pp. 351-354, and 3 cover pages.

* cited by examiner

POLYMER, POLYMER ELECTROLYTE MEMBRANE FOR POLYMER ELECTROLYTE FUEL CELL, AND MEMBRANE/ELECTRODE ASSEMBLY

BACKGROUND OF THE INVENTION

1. Field of the Invention

The present invention relates to a polymer, a polymer electrolyte membrane for polymer electrolyte fuel cells, and a membrane/electrode assembly.

2. Discussion of Background

A polymer electrolyte fuel cell is, for example, a stack of a plurality of cells each comprising a membrane/electrode assembly sandwiched between two separators. The membrane/electrode assembly comprises an anode and a cathode each having a catalyst layer and a polymer electrolyte membrane disposed between the anode and the cathode.

As a polymer to be used for the polymer electrolyte membrane, the following polymer has been widely used.

(1) A polymer obtained by subjecting a copolymer of a monomer represented by the following formula and tetrafluoroethylene to conversion to an acid form to convert —SO$_2$F groups to sulfonic acid groups (Non-Patent Document 1):

$$CF_2{=}CF{-}(OCF_2CF(CF_3))_m{-}O{-}(CF_2)_n{-}SO_2F$$

wherein m is an integer of from 0 to 1, and n is an integer of from 1 to 6.

For a polymer electrolyte fuel cell, further improvement in power generation performance is required, and therefore, as a polymer to be used for a polymer electrolyte membrane, a polymer having a low electrical resistance i.e. a low equivalent weight has been desired. In order to reduce the equivalent weight of the polymer (1), the number of sulfonic acid groups should be increased, that is, the proportion of the monomer represented by the above formula should be increased.

However, if the proportion of the monomer represented by the above formula is increased, a sufficiently high molecular weight of the polymer will hardly be achieved, and further, the polymer will be excessively swollen with water, whereby the mechanical strength of the resulting polymer electrolyte membrane will be insufficient. Further, in an operating environment of a polymer electrolyte fuel cell, the polymer electrolyte membrane undergoes repeats of swelling in a wet state and shrinkage in a dry state, whereby the polymer electrolyte membrane is likely to be cracked and damaged. As a result, the durability of a membrane/electrode assembly will be insufficient.

Non-Patent Document 1: W. Vielstich, H. A. Gasteiger, A. Lamm, "Handbook of Fuel Cells, vol. 3", U.S. John Wiley & Sons, Ltd., 2003, Chapter 30, p. 351-352

SUMMARY OF THE INVENTION

The present invention provides a polymer having a low electrical resistance, having a softening temperature higher than that of a conventional polymer for an electrolyte membrane and being highly flexible; a polymer electrolyte membrane for polymer electrolyte fuel cells having a low electrical resistance, having heat resistance higher than that of a conventional electrolyte membrane and being less likely to be broken even when it undergoes repeats of swelling in a wet state and shrinkage in a dry state; and a membrane/electrode assembly having high power generation performance, capable of power generation at a temperature higher than conventional one and being excellent in durability.

The polymer of the present invention is characterized by comprising repeating units represented by the following formula (U1) and repeating units represented by the following formula (U2):

  (U1)

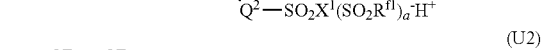  (U2)

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, "a" is 0 when $X^1$ is an oxygen atom, 1 when $X^1$ is a nitrogen atom, or 2 when $X^1$ is a carbon atom, $Y^1$ is a fluorine atom or a monovalent perfluoroorganic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, or 2 when $X^2$ is a carbon atom, $Y^2$ is a fluorine atom or a monovalent perfluoroorganic group, and t is 0 or 1.

The polymer preferably further comprises repeating units based on tetrafluoroethylene.

The polymer preferably has an equivalent weight of from 400 to 900 g/equivalent.

Of the polymer, (repeating units represented by the formula (U2))/(repeating units represented by the formula (U1)+repeating units represented by the formula (U2)) is preferably from 0.2 to 0.7 (molar ratio).

The polymer electrolyte membrane for polymer electrolyte fuel cells of the present invention is a membrane containing the above-described polymer.

The membrane/electrode assembly for polymer electrolyte fuel cells of the present invention is one comprising the polymer electrolyte membrane for polymer electrolyte fuel cells of the present invention disposed between an anode and a cathode, or one wherein a catalyst layer of at least one of an anode and a cathode contains the above-described polymer.

The polymer of the present invention has a low electrical resistance, has a softening temperature higher than that of a conventional polymer for an electrolyte membrane and is highly flexible.

The polymer electrolyte membrane for polymer electrolyte fuel cells of the present invention has a low electrical resistance, has heat resistance higher than that of a conventional electrolyte membrane and is less likely to be broken even when it undergoes repeats of swelling in a wet state and shrinkage in a dry state.

The membrane/electrode assembly for polymer electrolyte fuel cells of the present invention has high power generation performance, is capable of power generation at a temperature higher than conventional one and is excellent in durability.

MEANINGS OF SYMBOLS

Figure 1:
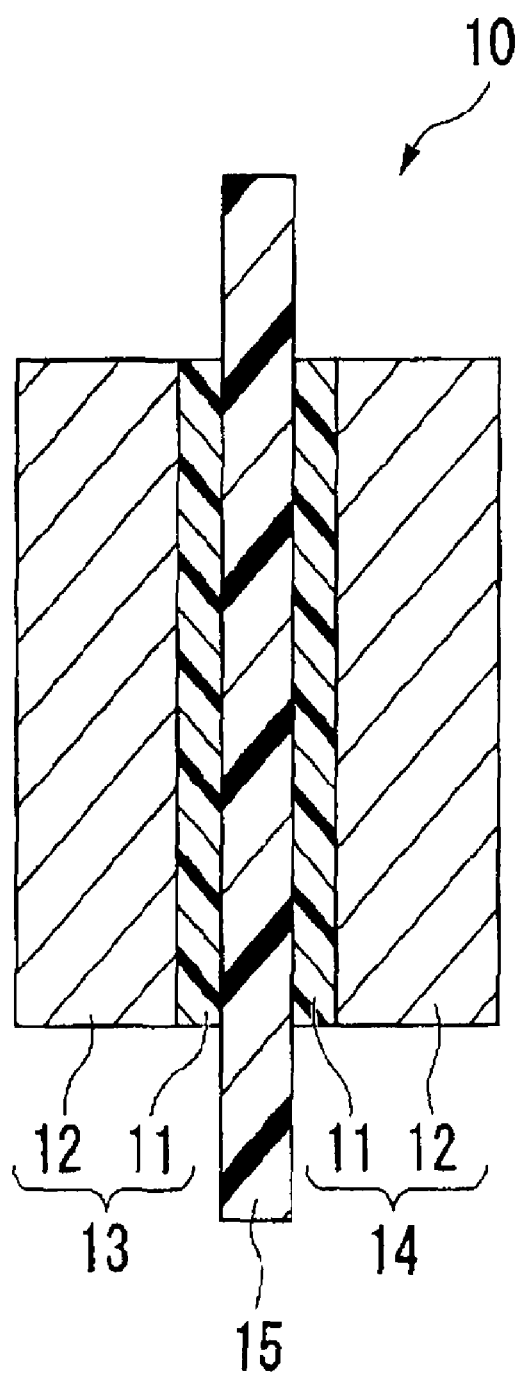
FIG. 1 is a cross-section illustrating one example of the membrane/electrode assembly of the present invention.

10: Membrane/electrode assembly
11: Catalyst layer
12: Gas diffusion layer
13: Anode
14: Cathode
15: Polymer electrolyte membrane
16: Carbon layer

DETAILED DESCRIPTION OF THE PREFERRED EMBODIMENTS

In the present specification, repeating units represented by the formula (U1) will be referred to as units (U1). The same applies to repeating units represented by other formulae. The repeating units are units derived from a monomer, formed by polymerization of the monomer. The repeating units may be units directly formed by the polymerization reaction or may be units having part of the units converted to another structure by treating the polymer.

Further, in the present specification, a compound represented by the formula (u1) will be referred to as compound (u1). The same applies to compounds represented by other formulae.

(Polymer)

The polymer of the present invention is a polymer comprising units (U1) and units (U2) (hereinafter referred to as a polymer H):

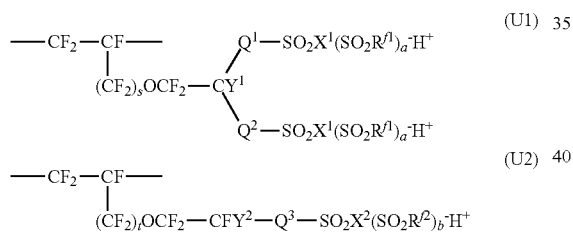

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, "a" is 0 when $X^1$ is an oxygen atom, 1 when $X^1$ is a nitrogen atom, or 2 when $X^1$ is a carbon atom, $Y^1$ is a fluorine atom or a monovalent perfluoroorganic group, and s is 0 or 1, $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, or 2 when $X^2$ is a carbon atom, $Y^2$ is a fluorine atom or a monovalent perfluoroorganic group, and t is 0 or 1.

The single bond means that the carbon atom of $CY^1$ or $CY^2$ and the sulfur atom of $SO_2$ are directly bonded.

The organic group is a group containing at least one carbon atom.

Units (U1):

In a case where the perfluoroalkylene group as each of $Q^1$ and $Q^2$ has an etheric oxygen atom, the number of such an oxygen atom may be one or more. Further, such an oxygen atom may be inserted in the carbon atom-carbon atom bond of the perfluoroalkylene group or may be inserted at the terminal of the carbon atom bond.

The perfluoroalkylene group may be linear or branched, and is preferably linear.

The number of carbon atoms in the perfluoroalkylene group is preferably from 1 to 6, more preferably from 1 to 4. When the number of carbon atoms is at most 6, the boiling point of the raw material fluoromonomer will be low, and purification by distillation will easily be carried out. Further, when the number of carbon atoms is at most 6, the increase in the equivalent weight of the polymer H will be suppressed, and the decrease in the proton conductivity of a polymer electrolyte membrane containing the polymer H will be suppressed.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, excellent stability in power generation performance will be achieved when a polymer electrolyte fuel cell is operated over a long period of time as compared with a case where $Q^2$ is a single bond.

At least one of $Q^1$ and $Q^2$ is preferably a $C_{1-6}$ perfluoroalkylene group having an etheric oxygen atom. A fluoromonomer having a $C_{1-6}$ perfluoroalkylene group having an etheric oxygen atom can be prepared without fluorination reaction with a fluorine gas, and accordingly its production is easy with high yield.

The perfluoroalkyl group as $R^{f1}$ may be linear or branched, and is preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

In a case where the unit (U1) has at least two $R^{f1}$'s, the $R^{f1}$'s may be the same groups or different groups.

The $—(SO_2X^1 (SO_2R^{f1})_a)^-H^+$ group is an ionic group.

The $—(SO_2X^1 (SO_2R^{f1})_a)^-H^+$ group may be a sulfonic acid group (a $—SO_3^-H^+$ group), an sulfonimide group (a $—SO_2N(SO_2R^{f1})^-H^+$ group) or a sulfonmethide group (a $—SO_2C(SO_2R^{f1})_2^-H^+$ group).

$Y^1$ is preferably a fluorine atom or a $C_{1-6}$ linear perfluoroalkyl group which may have an etheric oxygen atom.

The units (U1) are preferably units (M1), more preferably units (M11), units (M12) or units (M13) in view of easy preparation of the polymer H and easy industrial application:

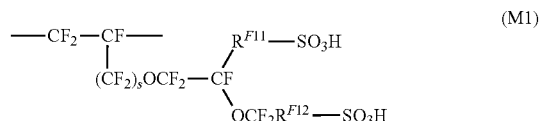

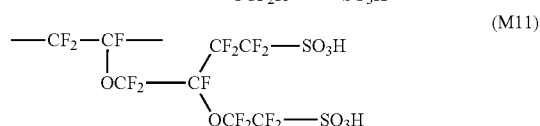

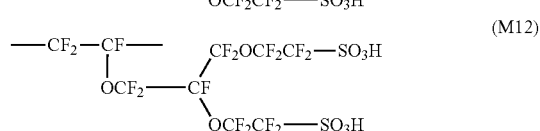

-continued

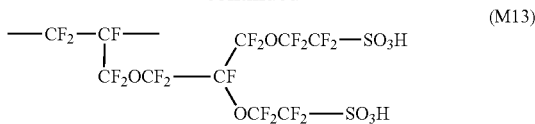
(M13)

wherein $R'^{11}$ is a single bond or a $C_{1-6}$ linear perfluoroalkylene group which may have an etheric oxygen atom, and $RF^{12}$ is a $C_{1-6}$ linear perfluoroalkylene group.

Units (U2):

In a case where the perfluoroalkylene group as $Q^3$ has an etheric oxygen atom, the number of such an oxygen atom may be one or more. Further, such an oxygen atom may be inserted in the carbon atom-carbon atom bond of the perfluoroalkylene group or may be inserted at the terminal of the carbon atom bond.

The perfluoroalkylene group may be linear or branched.

The number of carbon atoms in the perfluoroalkylene group is preferably from 1 to 6, more preferably from 1 to 4. When the number of carbon atoms is at most 6, the increase of the equivalent weight of the polymer H will be suppressed, and the decrease in the proton conductivity of an electrolyte membrane will be suppressed.

The perfluoroalkyl group as $R'^2$ may be linear or branched, and is preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

The —$(SO_2X^2 (SO_2R'^2)_b)^-H^+$ group is an ionic group.

The —$(SO_2X^2 (SO_2R'^2)_b)^-H^+$ group may be a sulfonic acid group (a —$SO_3^-H^+$ group), a sulfonimide group (—$SO_2N(SO_2R'^2)^-H^+$ group) or a sulfonmethide group (—$SO_2C(SO_2R'^2)_2)^-H^+$ group).

$Y^2$ is preferably a fluorine atom or a trifluoromethyl group.

The units (U2) are preferably units (M2), more preferably units (M21), units (M22), units (M23) or units (M24) in view of easy preparation of the polymer H and easy industrial application:

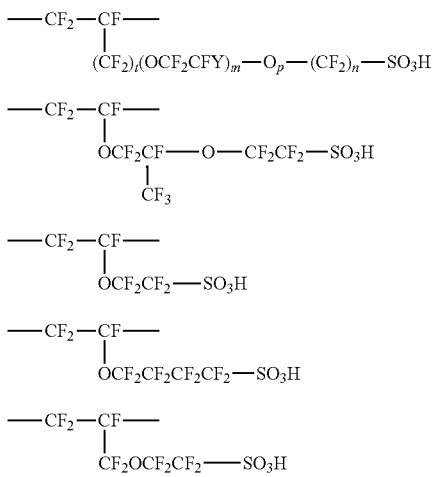

wherein Y is a fluorine atom or a trifluoromethyl group, m is an integer of from 0 to 3, n is an integer of from 1 to 12, and p is 0 or 1, provided that m+p>0.

Other Units:

The polymer H may further comprise repeating units based on another monomer described hereinafter (hereinafter referred to as other units). The ratio of other units is properly adjusted so that the equivalent weight of the polymer H will be within a preferred range described hereinafter.

Such other units are preferably repeating units based on a perfluoromonomer in view of mechanical strength and chemical durability of the electrolyte membrane, more preferably repeating units based on tetrafluoroethylene.

The ratio of the repeating units based on tetrafluoroethylene is preferably at least 20 mol %, more preferably at least 40 mol % based on all the repeating units (100 mol %) constituting the polymer H, in view of mechanical strength and chemical durability of the electrolyte membrane.

The ratio of the repeating units based on tetrafluoroethylene is preferably at most 92 mol %, more preferably at most 87 mol % based on all the repeating units (100 mol %) constituting the polymer H in view of electrical resistance of the electrolyte membrane.

The polymer H may comprise one type of each of the units (U1), the units (U2) and other units, or two or more types of each of these units.

The polymer H is preferably a perfluoropolymer in view of chemical durability of the electrolyte membrane.

The equivalent weight of the polymer H (grams of the polymer H per equivalent of ionic groups, hereinafter referred to as EW) is preferably from 400 to 900 g dry resin/equivalent (hereinafter referred to as g/equivalent), more preferably from 500 to 800 g/equivalent, more preferably from 550 to 780 g/equivalent, particularly preferably from 580 to 750 g/equivalent. When EW is at most 900 g/equivalent, the proton conductivity of the electrolyte membrane will be high (the electrical resistance will be low), and accordingly sufficient cell output will be obtained when such an electrolyte membrane is used as a polymer electrolyte membrane for polymer electrolyte fuel cells. When EW is at least 400 g/equivalent, preparation of a polymer having a high molecular weight will be easy, and further, the polymer H will not excessively be swollen with water, whereby mechanical strength of the electrolyte membrane will be maintained.

EW of a conventional polymer which has been widely used is considered to be from 900 to 1,100 g/equivalent due to the balance between the electrical resistance and the mechanical strength of a polymer electrolyte membrane. On the other hand, with the polymer H, mechanical strength can be maintained even when EW is reduced to lower the electrical resistance of the electrolyte membrane.

The ratio of the units (U2) in the polymer H is, as (units (U2))/(units (U1)+units (U2)), preferably from 0.2 to 0.7 (molar ratio), more preferably from 0.25 to 0.6, furthermore preferably from 0.3 to 0.55. If the ratio of the units (U2) is at least 0.2, the durability of the electrolyte membrane against repeats of a wet state and a dry state will be high, whereby a polymer electrolyte fuel cell can be operated stably over a long period of time. When the ratio of the units (U2) is at most 0.7, the water content of the electrolyte membrane will not be too high, and the softening temperature and the glass transition temperature will not be too low, and mechanical strength of the electrolyte membrane can be maintained.

The weight average molecular weight of the polymer H is preferably from $1 \times 10^4$ to $1 \times 10^7$, more preferably from $5 \times 10^4$ to $5 \times 10^6$, furthermore preferably from $1 \times 10^5$ to $3 \times 10^6$. When the weight average molecular weight of the polymer H is at least $1 \times 10^4$, physical properties such as degree of swelling will hardly change with time, and the durability of the electrolyte membrane will be sufficient. When the weight average molecular weight of the polymer H is at most $1\times10^7$, formation into a solution and molding will easily be carried out.

The weight average molecular weight of the polymer H can be evaluated by measuring the TQ value. The TQ value (unit: ° C.) indicates the molecular weight of a polymer and is defined as the temperature at which the amount of a polymer extruded becomes 100 mm$^3$/sec when melt extrusion is carried out under an extrusion pressure of 2.94 MPa by using a nozzle with a length of 1 mm and an inner diameter of 1 mm. For example, a polymer having a TQ value of from 200 to 300° C. corresponds to a polymer having a weight average molecular weight of from $1\times10^5$ to $1\times10^6$, although the weight average molecular weight varies depending upon the composition of the repeating units constituting the polymer.

(Process for Producing Polymer H)

The polymer H can be produced, for example, by the following steps.

(I) A step of polymerizing compound (u1), compound (u2) and as the case requires, another monomer to obtain a precursor polymer having —SO$_2$F groups (hereinafter referred to as a polymer F):

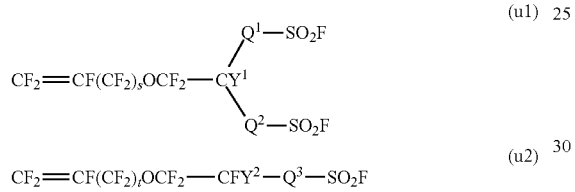

(II) A step of bringing the polymer F and a fluorine gas into contact with each other as the case requires to fluorinate unstable terminal groups of the polymer F.

(III) A step of converting —SO$_2$F groups of the polymer F to sulfonic acid groups, sulfonimide groups or sulfonmethide groups to obtain a polymer H.

Step (I):

Compound (u1) is preferably compound (m1), more preferably compound (m11), compound (m12) or compound (m13):

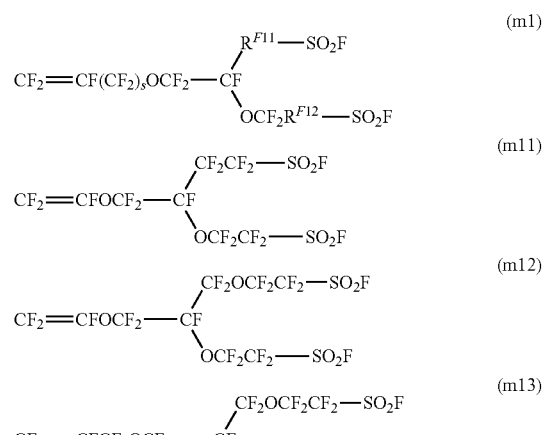

Compound (m1) can be prepared, for example, by the following synthesis route:

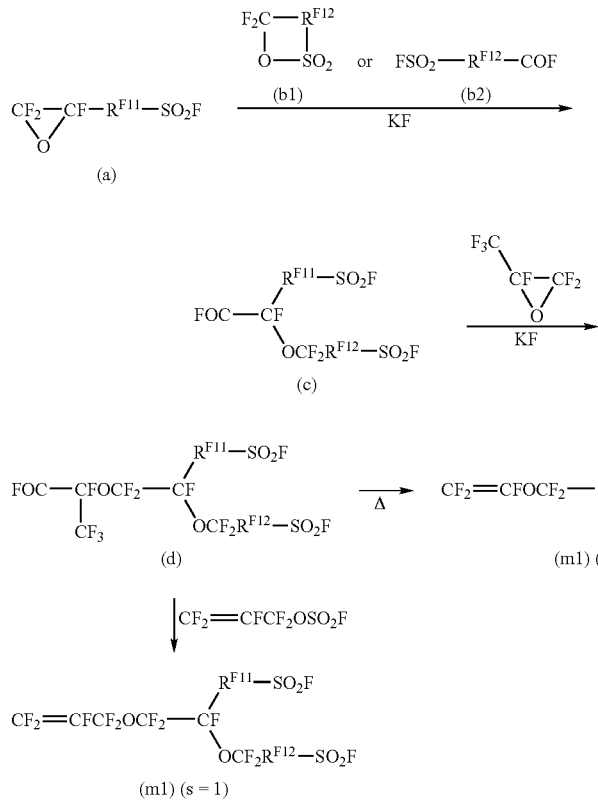

Compound (u2) is preferably compound (m2), more preferably compound (m21), compound (m22), compound (m23) or compound (m24):

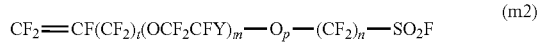
$$CF_2\!=\!CF(CF_2)_t(OCF_2CFY)_m\!-\!O_p\!-\!(CF_2)_n\!-\!SO_2F \quad (m2)$$

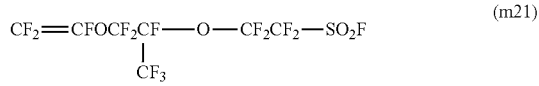
$$CF_2\!=\!CFOCF_2CF\!-\!O\!-\!CF_2CF_2\!-\!SO_2F \quad (m21)$$
$$\qquad\qquad\quad |$$
$$\qquad\qquad CF_3$$

$$CF_2\!=\!CFOCF_2CF_2\!-\!SO_2F \quad (m22)$$

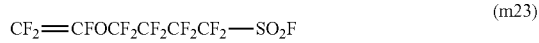
$$CF_2\!=\!CFOCF_2CF_2CF_2CF_2\!-\!SO_2F \quad (m23)$$

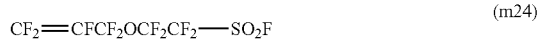
$$CF_2\!=\!CFCF_2OCF_2CF_2\!-\!SO_2F \quad (m24)$$

Compound (u2) is prepared by a known preparation method such as a method as disclosed in "Du Pont Innovation", D. J. Vaugham, Vol. 43, No. 3, 1973, p. 10, or a method as disclosed in Examples of U.S. Pat. No. 4,358,412.

The above another monomer may, for example, be tetrafluoroethylene, chlorotrifluoroethylene, trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), a perfluorovinyl ether (such as a perfluoro(alkyl vinyl ether) or a perfluoro(etheric oxygen atom-containing alkyl vinyl ether).

The perfluorovinyl ether is preferably compound (m3), more preferably compound (m31), compound (m32) or compound (m33):

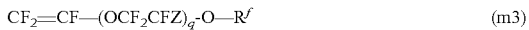
$$CF_2\!=\!CF\!-\!(OCF_2CFZ)_q\!-\!O\!-\!R^f \quad (m3)$$

$$CF_2\!=\!CF\!-\!O\!-\!(CF_2)_vCF_3 \quad (m31)$$

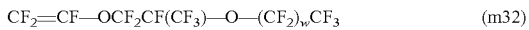
$$CF_2\!=\!CF\!-\!OCF_2CF(CF_3)\!-\!O\!-\!(CF_2)_wCF_3 \quad (m32)$$

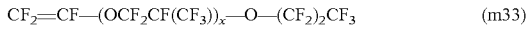
$$CF_2\!=\!CF\!-\!(OCF_2CF(CF_3))_x\!-\!O\!-\!(CF_2)_2CF_3 \quad (m33)$$

wherein Z is a fluorine atom or a trifluoromethyl group, $R^f$ is a linear or branched $C_{1-12}$ perfluoroalkyl group, q is an integer of from 0 to 3, v is an integer of from 1 to 9, w is an integer of from 1 to 9, and x is 2 or 3.

As another monomer, preferred is a perfluoromonomer in view of mechanical strength and chemical durability of the electrolyte membrane, more preferred is tetrafluoroethylene.

The polymerization method may be a known polymerization method such as a bulk polymerization method, a solution polymerization method, a suspension polymerization method or an emulsion polymerization method. Further, polymerization may be carried out in liquid or supercritical carbon dioxide.

The polymerization is carried out under conditions under which radicals will form. As a method of forming radicals, irradiation with radiation rays such as ultraviolet rays, γ rays or electron rays or addition of a radical initiator may, for example, be mentioned.

The polymerization temperature is usually from 10 to 150° C.

The radical initiator may, for example, be a bis(fluoroacyl) peroxide, a bis(chlorofluoroacyl) peroxide, a dialkyl peroxydicarbonate, a diacyl peroxide, a peroxyester, an azo compound or a persulfate, and with a view to obtaining a polymer F having a small number of unstable terminal groups, preferred is a perfluoro compound such as a bis(fluoroacyl) peroxide.

A solvent used in the solution polymerization method is preferably a solvent having a boiling point of from 20 to 350° C., more preferably a solvent having a boiling point of from 40 to 150° C. The solvent may, for example, be a perfluorotrialkylamine (such as perfluorotributylamine), a perfluorocarbon (such as perfluorohexane or perfluorooctane), a hydrofluorocarbon (such as 1H, 4H-perfluorobutane or 1H-perfluorohexane) or a hydrochlorofluorocarbon (such as 3,3-dichloro-1,1,1,2,2-pentafluoropropane or 1,3-dichloro-1,1,2,2,3-pentafluoropropane).

In the solution polymerization method, the monomers, the radical initiator and the like are added to the solvent to form radicals in the solvent thereby to polymerize the monomers. The monomers may be added all at once, may be added sequentially or may be added continuously.

In the suspension polymerization method, water is used as a dispersion medium, and the monomers, a nonionic radical initiator and the like are added to the dispersion medium to form radicals in the dispersion medium thereby to polymerize the monomers.

The nonionic radical initiator may, for example, be a bis(fluoroacyl) peroxide, a bis(chlorofluoroacyl) peroxide, a dialkyl peroxydicarbonate, a diacyl peroxide, a peroxyester, a dialkyl peroxide, a bis(fluoroalkyl) peroxide or an azo compound.

To the dispersion medium, the above solvent as an auxiliary agent, a surfactant as a dispersion stabilizer which prevents coagulation of suspended particles, a hydrocarbon compound (such as hexane or methanol) as a molecular weight modifier or the like may be added.

Step (II):

The unstable terminal group is a group formed by the chain transfer reaction, a group derived from the radical initiator, or the like, and specifically it is a —COOH group, a —CF=CF$_2$ group, a —COF group, a —CF$_2$H group or the like. By fluorinating or stabilizing such unstable terminal groups, decomposition of the polymer H will be suppressed, whereby durability of the electrolyte membrane will improve.

The fluorine gas may be diluted with an inert gas such as nitrogen, helium or carbon dioxide or may be used as it is without being diluted.

The temperature at which the polymer F and the fluorine gas are brought into contact with each other is preferably from room temperature to 300° C., more preferably from 50 to 250° C., furthermore preferably from 100 to 220° C., particularly preferably from 150 to 200° C.

The time over which the polymer F and the fluorine gas are in contact with each other is preferably from one minute to one week, more preferably from 1 to 50 hours.

Step (III):

For example, in a case where the —SO$_2$F groups are converted to sulfonic acid groups, step (III-1) is carried out, and when the —SO$_2$F groups are converted to sulfonimide groups, step (III-2) is carried out.

(III-1) A step of hydrolyzing the —SO$_2$F groups of the polymer F into a sulfonate, and converting the sulfonate to an acid form to obtain sulfonic acid groups.

(III-2) A step of imidizing the —SO$_2$F groups of the polymer F into salt form sulfonimide groups (—SO$_2$NMSO$_2$R$^{f1}$ groups) (wherein M is an alkali metal or a primary to quaternary ammonium) and further converting the sulfonimide groups to an acid form to obtain acid form sulfonimide groups (—SO$_2$NHSO$_2$R$^{f1}$ groups).

Step (III-1):

The hydrolysis is carried out, for example, by bringing the polymer F and a basic compound into contact with each other in a solvent.

The basic compound may, for example, be sodium hydroxide or potassium hydroxide. The solvent may, for example, be water or a solvent mixture of water and a polar solvent. The polar solvent may, for example, be an alcohol (such as methanol or ethanol) or dimethyl sulfoxide.

The conversion to an acid form is carried out, for example, by bringing the polymer having a sulfonate into contact with an aqueous solution of e.g. hydrochloric acid or sulfuric acid.

The hydrolysis and the conversion to an acid form are carried out usually at from 0 to 120° C.

Step (III-2):

As the imidization, the following method may be mentioned.

(III-2-1) A method of reacting the —$SO_2F$ group with $R^{f1}SO_2NHM$.

(III-2-2) A method of reacting the —$SO_2F$ group with $R^{f1}SO_2NH_2$ in the presence of an alkali metal hydroxide, an alkali metal carbonate, MF, ammonia or a primary to tertiary amine.

(III-2-3) A method of reacting the —$SO_2F$ group with $R^{f1}SO_2NMSi(CH_3)_3$.

The conversion to an acid form is carried out by treating the polymer having salt form sulfonimide groups with an acid (such as sulfuric acid, nitric acid or hydrochloric acid).

The polymer H wherein the ionic groups are sulfonimide groups can be prepared also by polymerizing compound (u1') brought by conversion of the —$SO_2F$ groups of compound (u1) to sulfonimide groups and compound (u2') brought by conversion of the —$SO_2F$ group of compound (u2) to sulfonimide group and another monomer as the case requires.

Each of compounds (u1') and (u2') can be prepared by adding chlorine or bromine to the unsaturated bond of each of compounds (u1) and (u2), converting the —$SO_2F$ group to a sulfonimide group in the same method as in the step (III-2) and then carrying out dechlorination or debromination using metal zinc.

The above-described polymer H comprises the units (U1) and the units (U2) and thereby has a low electrical resistance, has a softening temperature higher than that of a conventional polymer for an electrolyte membrane and is highly flexible. The reasons are as follows.

The side chain of each unit (U1) has two ionic groups, and the mobility of the side chain is low as compared with the unit (U2) having one ionic group in its side chain. Therefore, the softening temperature of the polymer H comprising the units (U1) and the units (U2) is considered to be high as compared with a polymer comprising the units (U2) and having no units (U1). Further, since the side chain of the unit (U2) has an effect of increasing the flexibility of the main chain of the polymer, it is considered that the polymer H comprising the units (U1) and the units (U2) is highly flexible as compared with a polymer comprising the units (U1) and having no units (U2).

(Polymer Electrolyte Membrane)

The polymer electrolyte membrane for polymer electrolyte fuel cells of the present invention (hereinafter referred to as the present electrolyte membrane) is a membrane containing the polymer H.

(Method for Producing the Present Electrolyte Membrane)

The present electrolyte membrane is produced, for example, by the following method.

(x-1) a method of forming the polymer F into a membrane and then carrying out the above step (III).

(x-2) a method of forming the polymer H obtained by the above step (III) into a membrane.

Method (x-1):

As a method of forming the polymer F into a membrane, extrusion molding, press molding, stretch molding or the like may be mentioned in view of excellent melt flowability of the polymer F.

Method (x-2):

As a method of forming the polymer H into a membrane, a method of applying a liquid composition of the polymer H to a substrate and drying it (cast method) may be mentioned.

The liquid composition is a dispersion liquid having the polymer H dispersed in a dispersion medium containing an organic solvent having a hydroxyl group and water.

The organic solvent having a hydroxyl group may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol, 3,3,4,4,5,5,6,6,7,7,8,8,8-tridecafluoro-1-octanol. The organic solvents having a hydroxyl group may be used alone or as a mixture of two or more.

The ratio of water is preferably from 10 to 99 mass %, more preferably from 40 to 99 mass % in the dispersion medium (100 mass %). By increasing the ratio of water, dispersibility of the polymer H in the dispersion medium will be improved.

The ratio of the organic solvent having a hydroxyl group is preferably from 1 to 90 mass %, more preferably from 1 to 60 mass % in the dispersion medium (100 mass %).

The ratio of the polymer H is preferably from 1 to 50 mass %, more preferably from 3 to 30 mass % in the liquid composition (100 mass %).

The liquid composition may contain a fluorinated solvent. The fluorinated solvent may, for example, be the fluorinated solvent used in the solution polymerization method in preparation of the polymer H.

To stabilize the present electrolyte membrane, heat treatment is preferably carried out. The temperature for the heat treatment depends on the type of the polymer H and is preferably from 130 to 200° C. When the temperature for the heat treatment is at least 130° C., the polymer H will not excessively contain water. When the temperature for the heat treatment is at most 200° C., thermal decomposition of the ionic groups will be suppressed, and the decrease in the proton conductivity of the present electrolyte membrane will be suppressed.

The present electrolyte membrane may be treated with a hydrogen peroxide solution as the case requires.

The present electrolyte membrane may be reinforced by a reinforcing material. The reinforcing material may, for example, be a porous substrate, fibers, woven fabric or non-woven fabric. As a material of the reinforcing material, polytetrafluoroethylene, a tetrafluoroethylene/hexafluoropropylene copolymer, a tetrafluoroethylene/perfluoro(alkyl vinyl ether) copolymer, polyethylene, polypropylene or polyphenylene sulfide may, for example, be mentioned.

The present electrolyte membrane may contain at least one type of atoms selected from the group consisting of cerium and manganese so as to further improve durability. Each of cerium and manganese decomposes hydrogen peroxide which causes deterioration of the present electrolyte membrane. Each of cerium and manganese is preferably present in the form of ions in the present electrolyte membrane, and it may be present in any state in the present electrolyte membrane so long as it is present in the form of ions.

The present electrolyte membrane may contain, as a water retention agent to prevent drying, silica or a heteropolyacid (such as zirconium phosphate, phosphomolybdic acid or phosphotungstic acid).

The above-described present electrolyte membrane contains the polymer H having a low electrical resistance, having a softening temperature higher than that of a conventional polymer for an electrolyte membrane and being highly flexible, and thereby has a low electrical resistance, has heat resistance higher than that of a conventional electrolyte membrane and is less likely to be broken even when it undergoes repeats of swelling in a wet state and shrinkage in a dry state.

(Membrane/Electrode Assembly)

FIG. 1 is a cross-section illustrating one example of the membrane/electrode assembly for polymer electrolyte fuel cells of the present invention (hereinafter referred to as a membrane/electrode assembly). The membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

(Polymer Electrolyte Membrane)

The polymer electrolyte membrane 15 is the above-described present electrolyte membrane containing the polymer H.

(Catalyst Layer)

The catalyst layer 11 is a layer containing a catalyst and a polymer having ionic groups.

The catalyst may be a catalyst having platinum or a platinum alloy supported on a carbon support.

The catalyst for the cathode 14 is preferably a catalyst having a platinum/cobalt alloy supported on a carbon support in view of durability.

The carbon support may be a carbon black powder, and preferably a carbon black powder graphitized by e.g. heat treatment in view of durability.

The polymer having ionic groups may, for example, be the same polymer H as in the polymer electrolyte membrane 15 or another polymer having ionic groups other than the polymer H. Such another polymer having ionic groups may, for example, be another fluoropolymer other than the polymer H or a hydrocarbon polymer. The polymer having ionic groups is preferably the polymer H in view of the durability.

Such another fluoropolymer is particularly preferably a copolymer comprising repeating units based on tetrafluoroethylene and repeating units based on a fluoromonomer having a sulfonic acid group. The repeating units based on a fluoromonomer having a sulfonic acid group are preferably units brought by conversion of repeating units based on the above compound (1) to an acid form.

The hydrocarbon polymer may, for example, be sulfonated polyarylene, sulfonated polybenzoxazole, sulfonated polybenzothiazole, sulfonated polybenzimidazole, sulfonated polysulfone, sulfonated polyethersulfone, sulfonated polyether ethersulfone, sulfonated polyphenylenesulfone, sulfonated polyphenylene oxide, sulfonated polyphenylene sulfoxide, sulfonated polyphenylene sulfide, sulfonated polyphenylene sulfide sulfone, sulfonated polyether ketone, sulfonated polyether ether ketone, sulfonated polyether ketone ketone or sulfonated polyimide.

The catalyst layer 11 may contain a water repellent with a view to increasing the effect of suppressing flooding. The water repellent may, for example, be a tetrafluoroethylene/hexafluoropropylene copolymer, a tetrafluoroethylene/perfluoro(alkyl vinyl ether) copolymer or polytetrafluoroethylene. The water repellent is preferably a fluoropolymer soluble in a solvent, with a view to easily carrying out water repellent treatment of the catalyst layer 11. The amount of the water repellent is preferably from 0.01 to 30 mass % in the catalyst layer 11 (100 mass %).

(Gas Diffusion Layer)

The gas diffusion layer 12 has a function to uniformly diffuse a gas into the catalyst layer and a function as a current collector.

The gas diffusion layer 12 may, for example, be carbon paper, carbon cloth or carbon felt.

The gas diffusion layer 12 is preferably subjected to water repellent treatment with e.g. polytetrafluoroethylene.

(Carbon Layer)

Figure 2:
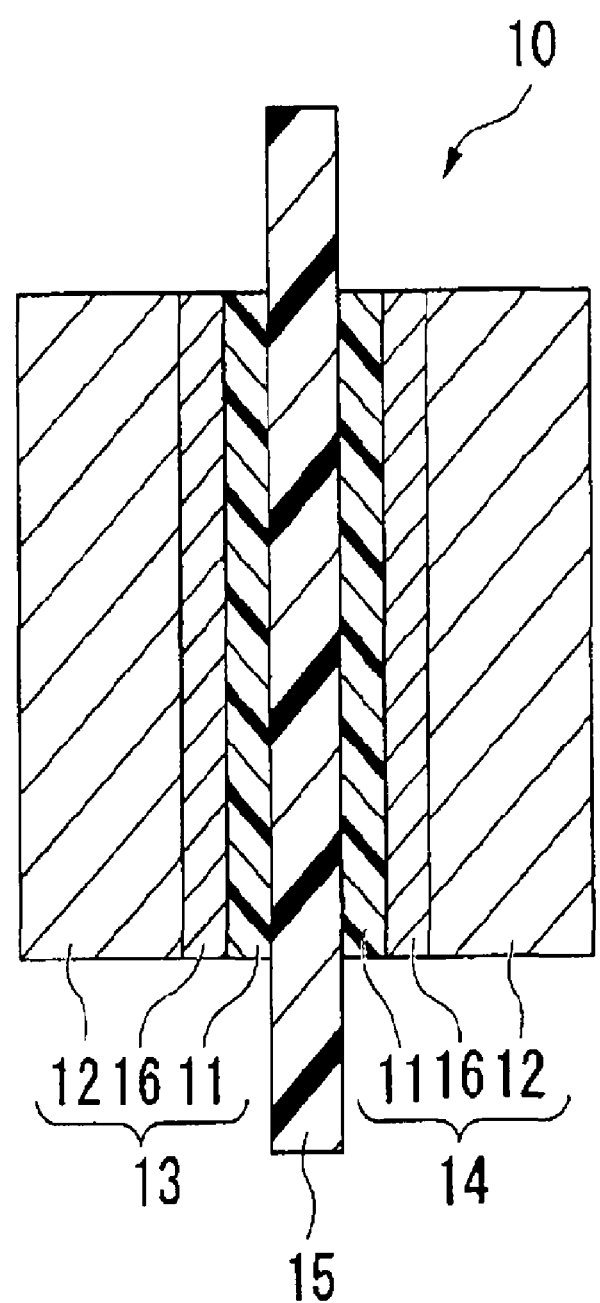
FIG. 2 is a cross-section illustrating another example of the membrane/electrode assembly of the present invention.

The membrane/electrode assembly 10 may have carbon layers 16 each between the catalyst layer 11 and the gas diffusion layer 12 as shown in FIG. 2. By disposing the carbon layers 16, the gas diffusibility on the surface of the catalyst layers 11 will improve, whereby the power generation performance of the polymer electrolyte fuel cell will remarkably improve.

The carbon layer 16 is a layer containing carbon and a nonionic fluoropolymer.

The carbon is preferably carbon nanofibers having a fiber diameter of from 1 to 1,000 nm and a fiber length of at most 1,000 μm.

The nonionic fluoropolymer may, for example, be polytetrafluoroethylene.

(Process for Producing Membrane/Electrode Assembly)

The membrane/electrode assembly 10 is produced, for example, by the following process.

(a-1) A process of forming catalyst layers 11 on a polymer electrolyte membrane 15 to prepare a membrane/catalyst layer assembly, and sandwiching the membrane/catalyst layer assembly between gas diffusion layers 12.

(a-2) A process of forming a catalyst layer 11 on a gas diffusion layer 12 to prepare electrodes (anode 13, cathode 14) and sandwiching a polymer electrolyte membrane 15 between the electrodes.

In a case where the membrane/electrode assembly 10 has carbon layers 16, the membrane/electrode assembly 10 is produced, for example, by the following process.

(b-1) A process of applying a dispersion liquid containing carbon and a nonionic fluoropolymer to a substrate film and drying the dispersion liquid to form a carbon layer 16, forming a catalyst layer 11 on the carbon layer 16, bonding such catalyst layers 11 and a polymer electrolyte membrane 15, separating the substrate films to prepare a membrane/catalyst layer assembly having carbon layers 16, and sandwiching the membrane/catalyst layer assembly between gas diffusion layers 12.

(b-2) A process of applying a dispersion liquid containing carbon and a nonionic fluoropolymer to a gas diffusion layer 12 and drying the dispersion liquid to form a carbon layer 16, and sandwiching a membrane/catalyst layer assembly in the process (a-1) between such gas diffusion layers 12 each having a carbon layer 16.

As a process for forming the catalyst layer 11, the following processes may be mentioned.

(y-1) A process of applying a liquid for forming a catalyst layer to a polymer electrolyte membrane 15, a gas diffusion layer 12 or a carbon layer 16 and drying the liquid.

(y-2) A process of applying a liquid for forming a catalyst layer to a substrate film and drying the liquid to form a catalyst layer 11, and transferring the catalyst layer 11 to a polymer electrolyte membrane 15.

The liquid for forming a catalyst layer is a liquid having a polymer with ionic groups and a catalyst dispersed in a dispersion medium. The liquid for forming a catalyst layer may be prepared, for example, by mixing the above liquid composition with a dispersion liquid of the catalyst.

The viscosity of the liquid for forming a catalyst layer varies depending upon the process for forming a catalyst layer 11 and accordingly the liquid may be a dispersion liquid having a viscosity of several tens cP or may be a paste having a viscosity of about 20,000 cP.

The liquid for forming a catalyst layer may contain a thickener to adjust the viscosity. The thickener may be ethyl cellulose, methyl cellulose, a cellosolve thickener or a fluorinated solvent (such as pentafluoropropanol or flon).

The above-described membrane/electrode assembly 10 uses, as a polymer electrolyte membrane 15, the present electrolyte membrane having a low electrical resistance, and thereby has high power generation performance (such as output). Particularly, it can achieve high power generation performance even in a low humidity environment and can thereby contribute to simplification of humidifying system.

Further, since it uses, as a polymer electrolyte membrane 15, the present electrolyte membrane having heat resistance higher than that of a conventional electrolyte membrane, it is capable of power generation at a temperature higher than conventional one and can contribute to increase in output of fuel cells and improvement in the cooling efficiency.

Further, since it uses, as a polymer electrolyte membrane 15, the present electrolyte membrane which is less likely to be broken even when it undergoes repeats of swelling in a wet state and shrinkage in a dry state, it is excellent in durability.
(Polymer Electrolyte Fuel Cell)

The membrane/electrode assembly of the present invention may be used for a polymer electrolyte fuel cell. A polymer electrolyte fuel cell is prepared, for example, by sandwiching a membrane/electrode assembly between two separators to form a cell, and stacking such a plurality of cells.

The separator may, for example, be an electrically conductive carbon plate having grooves formed to constitute flow paths for a fuel gas or an oxidant gas containing oxygen (such as the air or oxygen).

As a type of the polymer electrolyte fuel cell, a hydrogen/oxygen type fuel cell, a direct methanol type fuel cell (DMFC), etc. may be mentioned. Methanol or an aqueous methanol solution to be used as fuel for DMFC may be supplied by a liquid feed or by a gas feed.

Now, the present invention will be described in further detail with reference to Examples. However, it should be understood that the present invention is by no means restricted to such specific Examples.

Examples 1 to 8 are Preparation Examples, Examples 9 to 13 and 16 to 19 are Examples of the present invention, and Examples 14, 15 and 20 are Comparative Examples.
(EW)

EW of the polymer F was determined by the following method.

Two polymers (ones having EW of 1,000 g/equivalent and 909 g/equivalent) of which EW was preliminarily known by titration were prepared, and with respect to two films (thickness: 200 μm) made of the respective polymers, peak intensities based on sulfur atoms were measured by X-ray fluorescence spectrometer (RIX3000, manufactured by Rigaku Corporation) to prepare an calibration curve indicating the relation between the peak intensities and EW. The polymer F was pressed at a temperature of the TQ value described hereinafter to prepare a film with a thickness of 200 μm, and peak intensities based on sulfur atoms were measured by X-ray fluorescence spectrometer to determine EW from the above calibration curve. Since the ratio (molar ratio) of —$SO_2F$ groups in the polymer F is the same as the ratio (molar ratio) of —$SO_3H$ groups in the polymer H, EW of the polymer F can be regarded as EW of the polymer H as it is.
(Molar Ratio of Repeating Units)

The molar ratio of the repeating units constituting the polymer F was determined by melt-state $^{19}$F-NMR.
(TQ Value)

The TQ value (unit: ° C.) indicates the molecular weight of a polymer and is a temperature at which the amount of a polymer extruded becomes 100 mm$^3$/sec when melt extrusion is carried out under an extrusion pressure of 2.94 MPa by using a nozzle with a length of 1 mm and an inner diameter of 1 mm.

The amount of the polymer F extruded was measured by changing the temperature by using a flow tester CFT-500A (manufactured by Shimadzu Corporation) and the TQ value at which the amount extruded became 100 mm$^3$/sec was determined.
(Proton Conductivity)

The proton conductivity of a film of the polymer H was determined by the following method.

To a film of the polymer H with a width of 5 mm, a substrate having four-prove electrodes disposed thereon with a distance of 5 mm was closely contacted, and the resistance of the film was measured at an alternating current of 10 kHz at a voltage of 1 V under constant temperature and humidity conditions at a temperature of 80° C. with a relative humidity of 50% by a known four-probe method, and the proton conductivity was calculated from the results. The proton conductivity is used as a measure of the electrical resistance of a polymer electrolyte membrane.
(Softening Temperature, Glass Transition Temperature)

The softening temperature and the glass transition temperature of the polymer H were determined by the following method.

Using a dynamic viscoelasticity analyzer (DVA200, manufactured by ITK Co., Ltd.), the dynamic viscoelasticity of a film of the polymer H was measured under conditions with a sample width of 0.5 cm, a length of specimen between grips being 2 cm at a measuring frequency of 1 Hz at a temperature raising rate of 2° C./min, and the temperature at which the storage modulus becomes half the value at 50° C. was regarded as the softening temperature. Further, the glass transition temperature (Tg) was determined from the peak value of tan δ.
(Initial Cell Voltage)

As a separator, a carbon plate (groove width: 1 mm, land portion: 1 mm) having fine grooves for gas flow paths cut in a zigzag line was prepared.

Such separators were disposed on both outside surfaces of a membrane/electrode assembly, and a heater was further disposed on the outside of the separators to assemble a polymer electrolyte fuel cell with an effective membrane area of 25 cm$^2$.

The air and hydrogen were supplied to the cathode and the anode respectively at 0.15 MPa while the temperature of the polymer electrolyte fuel cell was maintained at 80° C. The respective gases were supplied to the respective electrodes in a state where they are humidified to a relative humidity of 50% by a humidifier. The cell voltages at electric current densities of 0.1 A/cm$^2$ and 1 A/cm$^2$ were respectively measured.
(Durability)

The durability of a membrane/electrode assembly against repeats of a wet state and a dry state was evaluated in accordance with the method disclosed in the following document.

Yeh-Hung Lai, Cortney K. Mittelsteadt, Craig S. Gittleman, David A. Dillard, "VISCOELASTIC STRESS MODEL AND MECHANICAL CHARACTERIZATION OF PERFLUOROSULFONIC ACID (PFSA) POLYMER ELECTROLYTE MEMBRANES", Proceedings of FUEL-CELL2005, Third International Conference on Fuel Cell Science, Engineering and Technology, FUELCELL2005, (2005), 74120.

Specifically, while the temperature of a polymer electrolyte fuel cell used for measurement of the initial cell voltage was maintained at 80° C., humidified air with a relative humidity of 150% was made to flow through both electrodes at 1 SLPM for two minutes, and the air with a relative humidity of 0% was made to flow at 1 SLPM for two minutes. 100 Cycles each cycle comprising the above operation were repeated. Every 100 cycles, a difference in pressure between both electrodes was caused to judge presence or absence of physical gas leak. A point where the gas leak occurred and the gas crossover rate became 10 sccm or above was judged as the end of a cell's life. The number of cycles at such a point was regarded as the index of the durability.

EXAMPLE 1

Compound (m12) was prepared by the following synthetic route:

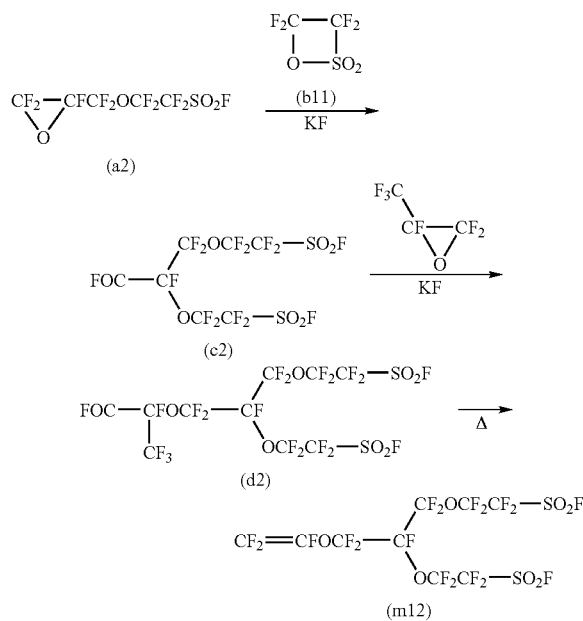

(i) Preparation of compound (a2):

Compound (a2) was prepared in the same manner as in the method as disclosed in Example 2 of JP-A-57-176973.

(ii) Preparation of compound (c2):

To a 300 cm³ four-necked round bottom flask equipped with a Dimroth condenser, a thermometer, a dropping funnel and a glass rod with an agitating blade, 1.6 g of potassium fluoride (tradename: Chloro-Catch F, manufactured by MORITA CHEMICAL INDUSTRIES CO., LTD.) and 15.9 g of dimethoxyethane were put in a nitrogen atmosphere. Then, the round bottom flask was cooled in an ice bath, and 49.1 g of compound (b11) was added dropwise from the dropping funnel over a period of 32 minutes at an internal temperature of at most 10° C. After completion of the dropwise addition, 82.0 g of compound (a2) was added dropwise from the dropping funnel over a period of 15 minutes. Substantially no increase in the internal temperature was observed. After completion of the dropwise addition, the internal temperature was recovered to room temperature, followed by stirring for about 90 minutes. The lower layer was recovered by a separatory funnel. The recovered amount was 127.6 g, and the gas chromatography (hereinafter referred to as GC) purity was 55%. The recovered liquid was put in a 200 cm³ four-necked round bottom flask, followed by distillation to obtain 97.7 g of compound (c2) as a fraction at a degree of vacuum of from 1.0 to 1.1 kPa (absolute pressure). The GC purity was 98%, and the yield was 80%.

(iii) Preparation of compound (d2):

To a 200 cm³ autoclave made of stainless steel, 1.1 g of potassium fluoride (tradename: Chloro-Catch F, manufactured by MORITA CHEMICAL INDUSTRIES CO., LTD.) was put. After deaeration, 5.3 g of dimethoxyethane, 5.3 g of acetonitrile and 95.8 g of compound (c2) were put in the autoclave under reduced pressure.

Then, the autoclave was cooled in an ice bath, 27.2 g of hexafluoropropene oxide was added over a period of 27 minutes at an internal temperature of from 0 to 5° C., and the internal temperature was recovered to room temperature with stirring, followed by stirring overnight. The lower layer was recovered by a separatory funnel. The recovered amount was 121.9 g, and the GC purity was 63%. The recovered liquid was subjected to distillation to obtain 72.0 g of compound (d2) as a fraction at a boiling point of 80 to 84° C./0.67 to 0.80 kPa (absolute pressure). The GC purity was 98%, and the yield was 56%.

(iv) Preparation of compound (m12):

Using a stainless steel tube with an inner diameter of 1.6 cm, a U-tube with a length of 40 cm was prepared. One end of the U-tube was filled with glass wool, and the other end was filled with glass beads with a stainless steel sintered metal as a perforated plate to prepare a fluidized bed type reactor. A nitrogen gas was used as a fluidizing gas so that raw materials could be continuously supplied by a metering pump. The outlet gas was collected using a trap tube with liquid nitrogen.

The fluidized bed type reactor was put in a salt bath, and 34.6 g of compound (d2) was supplied to the fluidized bed type reactor over a period of 1.5 hours so that the molar ratio of compound (d2)/$N_2$ would be 1/20 while the reaction temperature was maintained at 340° C. After completion of the reaction, 27 g of a liquid was obtained by the liquid nitrogen trap. The GC purity was 84%. The liquid was subjected to distillation to obtain compound (m12) as a fraction at a boiling point of 69° C./0.40 kPa (absolute pressure). The GC purity was 98%.

$^{19}$F-NMR (282.7 MHz, solvent: $CDCl_3$, standard: $CFCl_3$) of compound (m12).

δ (ppm): 45.5 (1F), 45.2 (1F), −79.5 (2F), −82.4 (4F), −84.1 (2F), −112.4 (2F), −112.6 (2F), −112.9 (dd, J=82.4 Hz, 67.1 Hz, 1F), −121.6 (dd, J=112.9 Hz, 82.4 Hz, 1F), −136.0 (ddt, J=112.9 Hz, 67.1 Hz, 6.1 Hz, 1F), -144.9 (1F).

EXAMPLE 2

Preparation of Polymer F1:

The interior of an autoclave (internal capacity: 2,575 cm³, made of stainless steel) was replaced with nitrogen, followed by sufficient deaeration. Under reduced pressure, 1,143.7 g of compound (m12), 205.2 g of compound (m21), 220.3 g of compound (2-1) as a solvent and 314.9 mg of compound (3-1)

as a radical initiator were charged, and the autoclave was deaerated to the vapor pressure:

$$CClF_2CF_2CHClF \quad (2\text{-}1),$$

$$(CH_3)_2C(CN)N{=}NC(CH_3)_2(CN) \quad (3\text{-}1).$$

The internal temperature was raised to 65° C., tetrafluoroethylene (hereinafter referred to as TFE) was introduced to the autoclave, and the pressure was adjusted at 1.11 MPaG (gauge pressure). Polymerization was carried out for 6.0 hours while the temperature and the pressure were maintained constant. Then, the autoclave was cooled to terminate the polymerization, and the gas in the system was purged.

The reaction liquid was diluted with compound (2-1), and compound (2-2) was added to coagulate the polymer, followed by filtration:

$$CH_3CCl_2F \quad (2\text{-}2).$$

The polymer was stirred in compound (2-1), and compound (2-2) was added to re-coagulate the polymer, followed by filtration. Such recoagulation was repeated twice. The polymer was dried under reduced pressure at 80° C. overnight, to obtain polymer F1 which is a copolymer of TFE, compound (m12) and compound (m21). The yield, EW, the ratio of repeating units constituting the polymer and the TQ value are shown in Table 1.

EXAMPLE 3

Preparation of Polymer F2:
Polymer F2 which is a copolymer of TFE, compound (m12) and compound (m21) was obtained in the same manner as in Example 2 except that the conditions were changed as identified in Table 1 and that methanol was charged together with the monomers, the solvent and the radical initiator. The yield, EW, the ratio of repeating units constituting the polymer and the TQ value are shown in Table 1.

TABLE 1

|  | Ex. 2 | Ex. 3 |
|---|---|---|
| Obtained precursor polymer | F1 | F2 |
| Autoclave (cm³) | 2575 | 1006 |
| Compound (m12) (g) | 1143.7 | 334.5 |
| Compound (m21) (g) | 205.2 | 239.4 |
| Compound (2-1) (g) | 220.3 | 103.2 |
| Type of radical initiator | (3-1) | (3-1) |
| Radical initiator (mg) | 314.9 | 542.6 |
| Methanol (mg) | 0 | 20.4 |
| Polymerization temperature (° C.) | 65 | 65 |
| Pressure (MPaG) | 1.11 | 1.2 |
| Polymerization time (hrs) | 6.0 | 6.5 |
| Yield (g) | 184.5 | 85.0 |
| EW (g/equivalent) | 641 | 741 |
| Units (TFE) (mol %) | 85 | 85.2 |
| Units (M12) (mol %) | 12 | 7.4 |
| Units (M21) (mol %) | 3 | 7.4 |
| U2/(U1 + U2) (molar ratio) | 0.2 | 0.5 |
| TQ (° C.) | 253 | 244 |

EXAMPLE 4

Preparation of Polymer F3:
The interior of an autoclave (internal capacity: 2,575 cm³, made of stainless steel) was replaced with nitrogen, followed by sufficient deaeration. Under reduced pressure, 950.3 g of compound (m12), 291.4 g of compound (m21), 490.1 g of compound (2-1) as a solvent, 173.7 mg of methanol and 873.1 mg of compound (3-2) (PEROYL IPP, manufactured by NOF CORPORATION) as a radical initiator were charged, and the autoclave was deaerated to the vapor pressure:

$$(CH_3)_2CHOC({=}O)OOC({=}O)OCH(CH_3)_2 \quad (3\text{-}2).$$

The internal temperature was raised to 40° C., TFE was introduced to the autoclave, and the pressure was adjusted at 0.44 MPaG (gauge pressure). Polymerization was carried out for 6.0 hours while the temperature and the pressure were maintained constant. Then, the autoclave was cooled to terminate the polymerization, and the gas in the system was purged.

The reaction liquid was diluted with compound (2-1), and compound (2-2) was added to coagulate the polymer, followed by filtration.

The polymer was stirred in compound (2-1), and compound (2-2) was added to re-coagulate the polymer, followed by filtration. Such recoagulation was repeated twice. The polymer was dried under reduced pressure at 80° C. overnight to obtain polymer F3 which is a copolymer of TFE, compound (m12) and compound (m21). The yield, EW, the ratio of repeating units constituting the polymer and the TQ value are shown in Table 2.

EXAMPLE 5

Preparation of Polymer F4:
Polymer F4 which is a copolymer of TFE, compound (m12) and compound (m21) was obtained in the same manner as in Example 4 except that the conditions were changed as identified in Table 2. The yield, EW, the ratio of repeating units constituting the polymer and the TQ value are shown in Table 2.

EXAMPLE 6

Preparation of Polymer F5:
Polymer F5 which is a copolymer of TFE, compound (m12) and compound (m21) was obtained in the same manner as in Example 4 except that the conditions were changed as identified in Table 2. The yield, EW, the ratio of repeating units constituting the polymer and the TQ value are shown in Table 2.

EXAMPLE 7

Preparation of Polymer F6:
Polymer F6 which is a copolymer of TFE and compound (m12) was obtained in the same manner as in Example 4 except that the conditions were changed as identified in Table 2. The yield, EW, the ratio of repeating units constituting the polymer and the TQ value are shown in Table 2.

TABLE 2

|  | Ex. 4 | Ex. 5 | Ex. 6 | Ex. 7 |
|---|---|---|---|---|
| Obtained precursor polymer | F3 | F4 | F5 | F6 |
| Autoclave (cm³) | 2575 | 230 | 2575 | 1006 |
| Compound (m12) (g) | 950.3 | 68.67 | 604.0 | 492.8 |
| Compound (m21) (g) | 291.4 | 40.02 | 528.1 | 0 |
| Compound (2-1) (g) | 490.1 | 45.03 | 484.1 | 76.0 |
| Type of radical initiator | (3-2) | (3-2) | (3-2) | (3-1) |
| Radical initiator (mg) | 873.1 | 68.2 | 729.8 | 57.5 |
| Methanol (mg) | 173.7 | 6.96 | 0 | 0 |
| Polymerization temperature (° C.) | 40 | 40 | 40 | 65 |

TABLE 2-continued

|  | Ex. 4 | Ex. 5 | Ex. 6 | Ex. 7 |
|---|---|---|---|---|
| Pressure (MPaG) | 0.44 | 0.42 | 0.37 | 1.15 |
| Polymerization time (hrs) | 6.0 | 6.5 | 9.0 | 10.4 |
| Yield (g) | 203.4 | 15.1 | 188.8 | 94.1 |
| EW (g/equivalent) | 645 | 641 | 629 | 617 |
| Units (TFE) (mol %) | 84.0 | 81.7 | 79.4 | 85.9 |
| Units (M12) (mol %) | 11.2 | 10.0 | 9.3 | 14.1 |
| Units (M21) (mol %) | 4.8 | 8.3 | 11.3 | 0 |
| U2/(U1 + U2) (molar ratio) | 0.3 | 0.45 | 0.55 | 0 |
| TQ (° C.) | 269 | 262 | 237 | 248 |

EXAMPLE 8

Preparation of Polymer F7:

The interior of an autoclave (internal capacity: 230 cm$^3$, made of stainless steel) was replaced with nitrogen, followed by sufficient deaeration. Under reduced pressure, 180.0 g of compound (m21) was charged, and 15.5 mg of solution (A) containing 4.9 mass % of compound (3-3) as a radical initiator in compound (2-1) was further added, and the autoclave was freeze-deaerated with liquid nitrogen twice:

$(CF_3CF_2CF_2OCF(CF_3)CF_2OCF(CF_3)COO)_2$     (3-3).

The internal temperature was raised to 33° C., TFE was introduced to the autoclave, and the pressure was adjusted at 0.34 MPaG (gauge pressure). While the temperature and the pressure were maintained constant, a mixture comprising 5.86 mg of the above solution (A) and 15 mg of compound (m21) was added 15 times every 30 minutes. After 15th addition, reaction was continued for 30 minutes. After 8.0 hours, the autoclave was cooled to terminate the polymerization, and the gas in the system was purged.

The reaction liquid was diluted with compound (2-1), and compound (2-2) was added to coagulate the polymer, followed by filtration.

The polymer was stirred in compound (2-1), and compound (2-2) was added to re-coagulate the polymer, followed by filtration. Such recoagulation was repeated twice. The polymer was dried under reduced pressure at 80° C. overnight to obtain polymer F7 which is a copolymer of TFE and compound (m21). The yield was 7.0 g, EW was 667 g/equivalent and the TQ value was 247° C.

EXAMPLE 9

Preparation of Film of Polymer H1:

Polymer F1 was treated by the following method to obtain a film of acid form polymer H1.

First, polymer F1 was formed into a film with a thickness of 150 μm by press molding at the TQ temperature of polymer F1.

Then, the above film was immersed in an aqueous solution containing 30 mass % of dimethyl sulfoxide and 15 mass % of potassium hydroxide at 80° C. for 16 hours to hydrolyze —SO$_2$F groups in the film thereby to convert these groups to —SO$_3$K groups.

Then, the above film was immersed in a 3 mol/L hydrochloric acid aqueous solution at 50° C. for 2 hours. The hydrochloric acid aqueous solution was exchanged, and the same treatment was further carried out four times. The film was sufficiently washed with deionized water to obtain a film of polymer H1 having —SO$_3$K groups in the film converted to sulfonic acid groups.

The softening temperature, the glass transition temperature and the proton conductivity of the film of polymer H1 were measured. The results are shown in Table 3.

EXAMPLES 10 to 15

Preparation of Films of Polymers H2 to H7:

Films of acid form polymers H2 to H7 were obtained in the same manner as in Example 9 except that polymers F2 to F7 were used instead of polymer F1.

The softening temperatures, the glass transition temperatures and the proton conductivities of the films of polymers H2 to H7 were measured. The results are shown in Table 3.

TABLE 3

|  | Ex. 9 | Ex. 10 | Ex. 11 | Ex. 12 | Ex. 13 | Ex. 14 | Ex. 15 |
|---|---|---|---|---|---|---|---|
| Precursor polymer used | F1 | F2 | F3 | F4 | F5 | F6 | F7 |
| Obtained acid form polymer | H1 | H2 | H3 | H4 | H5 | H6 | H7 |
| Softening temperature (° C.) | 103 | 93 | 97 | 88 | 83 | 104 | 71 |
| Tg (tanδ) (° C.) | 134 | 122 | 127 | 118 | 112 | 138 | 94 |
| Proton conductivity (S/cm) | 0.12 | 0.08 | 0.12 | 0.12 | 0.13 | 0.13 | 0.10 |

EXAMPLE 16

Preparation of Polymer Electrolyte Membrane:

To polymer H1, a mixed dispersion medium of ethanol, water and 1-butanol (ethanol/water/1-butanol=35/50/15 by mass ratio) was added to adjust the solid content concentration to 15 mass %, followed by stirring by using an autoclave at 125° C. for 8 hours. Water was further added to adjust the solid content concentration to 9 mass % to obtain liquid composition S1 having polymer H1 dispersed in a dispersion medium. The composition of the dispersion medium was ethanol/water/1-butanol=21/70/9 (mass ratio).

Ce₂(CO₃)₃·8H₂O in the number of mols corresponding to 5% of ionic groups in liquid composition S1 was added, followed by stirring at room temperature for 4 hours, and the resulting liquid composition was applied to a sheet made of a copolymer of ethylene and TFE (AFLEX 100N, tradename, manufactured by Asahi Glass Company, Limited, thickness: 100 μm) (hereinafter referred to as an ETFE sheet) by a die coater and dried at 80° C. for 30 minutes, and further annealed at 170° C. for 30 minutes to form polymer electrolyte membrane R1 with a thickness of 25 μm.

Preparation of Membrane/Electrode Assembly:

Water and ethanol were added in this order to platinum supported on carbon to obtain a catalyst dispersion liquid (solid content concentration: 9 mass %) having platinum supported on carbon dispersed in a mixed dispersion medium of ethanol and water (ethanol/water=1/1 mass ratio).

Liquid composition S1 and the catalyst dispersion liquid were mixed in a ratio of liquid composition/catalyst dispersion liquid=1/2 (mass ratio) to prepare a liquid for forming a catalyst layer.

The ETFE sheet was separated from polymer electrolyte membrane R1, and the liquid for forming a catalyst layer was applied to both surfaces of polymer electrolyte membrane R1 by die coating and dried to form a catalyst layer having a thickness of 10 μm and an amount of platinum supported of 0.2 mg/cm². Carbon cloth as a gas diffusion layer was disposed on both outside surfaces of the catalyst layers to obtain a membrane/electrode assembly.

Using the membrane/electrode assembly, a polymer electrolyte fuel cell was prepared, and the initial cell voltage was measured and the durability was evaluated. The results are shown in Table 4.

EXAMPLES 17 to 20

Preparation of Polymer Electrolyte Membranes:

Polymer electrolyte membranes R3 to R6 were obtained in the same manner as in Example 16 except that polymers H3 to H6 were used instead of polymer H1.

Membrane/electrode assemblies in Example 17 to 19 were obtained in the same manner as in Example 16 except that polymer electrolyte membranes R3 to R5 were used instead of polymer electrolyte membrane R1.

Further, liquid composition S2 was obtained in the same manner as in preparation of liquid composition S1 except that polymer H6 was used instead of polymer H.

Membrane/electrode assembly in Example 20 was obtained in the same manner as in Example 16 except that liquid composition S2 was used instead of liquid composition S1 and polymer electrolyte membrane R6 was used instead of polymer electrolyte membrane R1.

Using the membrane/electrode assemblies, polymer electrolyte fuel cells were prepared, and the initial cell voltage was measured and the durability was evaluated. The results are shown in Table 4.

TABLE 4

| Membrane/electrode assembly | Ex. 16 | Ex. 17 | Ex. 18 | Ex. 19 | Ex. 20 |
|---|---|---|---|---|---|
| Polymer electrolyte membrane | R1 | R3 | R4 | R5 | R6 |

TABLE 4-continued

| Membrane/electrode assembly | | Ex. 16 | Ex. 17 | Ex. 18 | Ex. 19 | Ex. 20 |
|---|---|---|---|---|---|---|
| Acid form polymer | | H1 | H3 | H4 | H5 | H6 |
| Initial cell voltage (mV) | Electric current density 0.1 A/cm² | 810 | 810 | 810 | 810 | 810 |
| | Electric current density 1 A/cm² | 680 | 700 | 680 | 700 | 700 |
| Durability (number of cycles) | | 20000 | 22000 | 25000 | 20000 | 5000 |

By using the polymer electrolyte membrane and the membrane/electrode assembly of the present invention, a long life polymer electrolyte fuel cell can be obtained.

What is claimed is:

1. A polymer comprising repeating units represented by the following formula (U1) and repeating units represented by the following formula (U2):

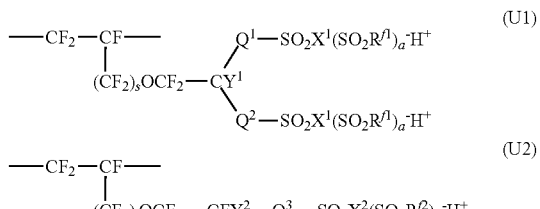

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, or 2 when $X^1$ is a carbon atom, $Y^1$ is a fluorine atom or a monovalent perfluoroorganic group, and s is 0 or 1;

$Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, or 2 when $X^2$ is a carbon atom, $Y^2$ is a fluorine atom or a monovalent perfluoroorganic group, and t is 0 or 1.

2. The polymer according to claim 1, which further comprises repeating units based on tetrafluoroethylene.

3. The polymer according to claim 1, which has an equivalent weight of from 400 to 900 g/equivalent.

4. The polymer according to claim 1, wherein (repeating units represented by the formula (U2))/(repeating units represented by the formula (U1)+repeating units represented by the formula (U2)) is from 0.2 to 0.7 (molar ratio).

5. The polymer according to claim 2, which has an equivalent weight of from 400 to 900 g/equivalent.

6. The polymer according to claim 2, wherein (repeating units represented by the formula (U2))/(repeating units represented by the formula (U1)+repeating units represented by the formula (U2)) is from 0.2 to 0.7 (molar ratio).

7. The polymer according to claim 6, which has an equivalent weight of from 400 to 900 g/equivalent.

* * * * *